(12) United States Patent
Hallot et al.

(10) Patent No.: US 9,243,138 B2
(45) Date of Patent: Jan. 26, 2016

(54) PROPYLENE-ETHYLENE RANDOM COPOLYMER

(75) Inventors: Gaetane Hallot, Grimbergen (BE); Jean-Marc Roland Ghislain Vion, Limelette (BE)

(73) Assignee: INEOS MANUFACTURING BELGIUM NV, Antwerp (BE)

( * ) Notice: Subject to any disclaimer, the term of this patent is extended or adjusted under 35 U.S.C. 154(b) by 0 days.

(21) Appl. No.: 14/005,675

(22) PCT Filed: Mar. 12, 2012

(86) PCT No.: PCT/EP2012/054259
§ 371 (c)(1),
(2), (4) Date: Sep. 17, 2013

(87) PCT Pub. No.: WO2012/126759
PCT Pub. Date: Sep. 27, 2012

(65) Prior Publication Data
US 2014/0005337 A1    Jan. 2, 2014

(30) Foreign Application Priority Data
Mar. 18, 2011  (EP) .................................... 11158878

(51) Int. Cl.
*C08L 23/14*     (2006.01)
(52) U.S. Cl.
CPC ............. *C08L 23/14* (2013.01); *C08L 23/142* (2013.01); *C08L 2205/02* (2013.01); *C08L 2308/00* (2013.01); *C08L 2314/02* (2013.01)

(58) Field of Classification Search
CPC ... C08L 23/142; C08L 23/14; C08L 2205/02; C08L 2308/00; C08L 2314/02; C08L 2666/06
USPC ......................................................... 525/240
See application file for complete search history.

(56) References Cited

U.S. PATENT DOCUMENTS

2007/0161747 A1   7/2007 Maier et al.
2009/0306271 A1* 12/2009 Ommundsen et al. ........ 524/439

FOREIGN PATENT DOCUMENTS

| EP | 0 263 718 A2 | 4/1988 |
|---|---|---|
| EP | 0 263 718 A3 | 4/1988 |
| EP | 1 788 023 A1 | 5/2007 |
| EP | 2 042 552 A1 | 4/2009 |
| EP | 2 065 407 A1 | 6/2009 |
| WO | WO 99/07788 A1 | 2/1999 |

* cited by examiner

*Primary Examiner* — Nathan M Nutter
(74) *Attorney, Agent, or Firm* — Nixon & Vanderhye P.C.

(57) ABSTRACT

Propylene random copolymer composition containing (A) 60-80 wt % of a copolymer of propylene and from 0.1 to 2 wt % of units derived from ethylene; and (B) 20-40 wt % of a copolymer of propylene and from 7 to 15 wt % of units derived from ethylene. The composition has a total ethylene content of from 3 to 4.5 wt % and a melt flow rate value according to ISO 1133 (230° C., 2.16 kg) of from 10 to 120 g/100 min. Cast films, sheets, or injection molded or injection stretch blow molded articles made from the above composition are also disclosed.

24 Claims, No Drawings

`US 9,243,138 B2`

PROPYLENE-ETHYLENE RANDOM COPOLYMER

This application is the U.S. national phase of International Application No. PCT/EP2012/054259 filed 12 Mar. 2012 which designated the U.S. and claims priority to European Patent Application No. 11158878.6 filed 18 Mar. 2011, the entire contents of each of which are hereby incorporated by reference.

The present invention relates to thermoplastic polyolefin compositions and to articles obtained therefrom. In particular, the compositions described herein below are suitable for the production of moulded articles having good rigidity and good impact properties, and also having good transparency.

Propylene homopolymers have high resistance to heat and chemicals as well as beneficial mechanical properties. However, other properties of propylene homopolymers such as impact strength, particularly at low temperature, flexibility/rigidity, clarity or haze need to be improved for specific applications.

It is known that mechanical properties such as impact strength or optical properties can be improved by copolymerising propylene with ethylene or other alpha-olefins. If these comonomers are randomly distributed within the polymeric chain, a propylene random copolymer is obtained. Propylene random copolymers can be used in blow moulding, injection moulding and film extrusion applications for the preparation of materials such as food packaging, medical packaging and consumer products. For specific applications, large amounts of comonomer may need to be incorporated into the polypropylene, e.g. to provide a material having a higher flexibility and softness, and also greater impact strength: comonomer incorporation is known to reduce rigidity. Furthermore, optical properties as well as sealability are improved in polypropylenes having a higher comonomer content.

EP 2065407A discloses generally propylene random copolymers intended to have relatively low stickiness during the polymerisation process, which comprise a first fraction having a comonomer content of 0.5-6 wt % and a second fraction having a comonomer content of 5-12 wt %. It further discloses specific examples in which the first propylene copolymer fraction contains 3-4 wt % ethylene and the second fraction contains 8-9 wt % ethylene, the ratio of the fractions being 50:50, the total ethylene content being about 6 wt %, and the overall MFR being 4-6 g/10 min.

EP 2042552A discloses propylene-ethylene random copolymers having a total ethylene content of 1-10 wt %, preferably no more than 5 wt %, and an MFR of 3-20 g/10 min, and which comprises a mixture of two such polymers, one of which contains 0.5-8 wt % ethylene, and the other of which always contains more ethylene. It is stated to be most preferred that the ethylene content in the two blocks does not exceed 3.0 wt % and 4.0 wt % respectively: in the Examples the highest ethylene content in either block is 3.2 wt %. The compositions are said to have good mechanical and optical properties. However none of the Examples has a flexural modulus above 900 Mpa. This is believed to be at least partly due to the relatively small difference in C2 content between the two blocks.

EP 1788023A discloses a multimodal polymer suitable for making biaxially oriented films or articles, which has an MFR of at least 6 g/10 min and comprises a blend of a polypropylene homopolymer or copolymer containing up to 5 wt % ethylene and a polypropylene copolymer which may contain up to 10 wt % comonomer. A broad range of block ratios is disclosed, with the most preferred range being 45:55-55:45. All but one of the Examples have a maximum ethylene content in either block below 6 wt %: the one exception (Example 7) is a blend of a homopolymer and a copolymer.

It is known from the prior art that low release of chemical substances is highly desirable for articles to be used in contact with food. WO 03/046021 describes thermoplastic polyolefin compositions suitable for producing injection-moulded articles having low hexane-extractable moiety; said compositions including in its broadest aspect a propylene polymer having a melt flow rate MFR of 3-30 g/10 min, which comprises 50-90 wt % of a propylene copolymer containing 1-7 wt % of units derived from ethylene and 10-50 wt % of a propylene copolymer containing 8-40 wt % of units derived from ethylene. The MFR of the final propylene polymer is obtained by subjecting to peroxidic degradation a precursor composition having a lower MFR value. However it is known that the process of peroxidic degradation or "cracking" results in compounds having poorer organoleptic properties, as well as poorer stiffness.

WO 2006/082144 discloses a propylene polymer having an MFR of 20-40 g/10 min which has not been obtained by peroxidic degradation, and comprising in its broadest aspect 75-95 wt % of a propylene copolymer containing 0.5-3 mol % of units derived from ethylene and 5-25 wt % of a propylene copolymer containing 25-45 mol % of units derived from ethylene.

We have found propylene copolymer compositions which have a good balance of impact resistance and stiffness as well as good optical properties. Accordingly in a first aspect the present invention provides a random copolymer composition comprising (A) 60-85 wt % of a copolymer of propylene and from 0.1 to 2 wt % of units derived from ethylene; and (B) 15-40 wt % of a copolymer of propylene and from 7 to 17 wt % of units derived from ethylene, said composition having a total ethylene content of from 3 to 4.5 wt %, and a melt flow rate value according to ISO 1133 (230 C, 2.16 kg) of from 10 to 120 g10 min.

The compositions of the invention have an excellent balance of impact resistance and rigidity, as well as good thermal resistance and crystallisation speed, particularly compared with similar compositions which contain more ethylene in fraction (A) and which have a lower MFR. The greater difference in ethylene content between the two blocks compared with compositions such as those disclosed in EP 2042552A increases the stiffness of the composition, by increasing phase separation of the blocks and thereby ensuring that stiffness is largely controlled by the matrix (A), which has a relatively low ethylene content compared to (B).

The relatively high MFR also results in good processability, which is particularly important for injection moulding. The balance of ethylene content in the two fractions also results in relatively good optical properties, whilst the balance of MFRs between the two fractions—relatively high in the more crystalline fraction (A) and relatively low in the more rubbery fraction (B)—can lead to lower levels of hexane extractables.

The MFR value according to ISO 1133 of the composition is preferably between 15 and 100 g/10 min, more preferably between 20 and 80 g/10 min, and most preferably between 20 and 60 g/l.

In one embodiment of the invention the melt flow rate value is from 50 to 120 g/10 min. In this embodiment it is preferred that the MFR of the final propylene polymer is obtained by subjecting to degradation, preferably degradation by peroxide, a precursor composition having a lower MFR value. In such a case the precursor polymer compositions produced in the polymerisation process have an MFR value ranging from 20 to 60 g/10 min. The precursor compositions are then subjected to a chemical degradation treatment (visbreaking) of the polymer chains according to processes well known in the art in order to obtain the required MFR. The chemical degradation of the polymer is carried out in the presence of free radical initiators, such as peroxides. Examples of suitable radical initiators that can be used for this purpose include 2,5-dimethyl-2,5-di(tert-butylperoxide)-hexane and and 3,6, 9-triethyl-3,6,9-trimethyl-1,2,4,5,7,8-hexoxonane. The degradation treatment is carried out by using the appropriate quantities of free radical initiators, and preferably takes place in an inert atmosphere, such as nitrogen. Methods, apparatus, and operating conditions known in the art can be used to carry out this process. In the present invention, the ratio of the MFR of the final composition after degradation to that of the precursor composition is preferably 2:1 or less.

In an alternative embodiment of the invention the melt flow rate value according to ISO 1133 is from 10 to 60 g/10 min, preferably from 20 to 60 g/10 min. In this embodiment it is preferred that the composition has not been subjected to any form of degradation in order to increase the MFR value.

Fraction (A) is preferably present in the composition in an amount of 65-83 wt %, and more preferably from 68-82 wt %.

Fraction (B) is preferably present in the composition in an amount of 17-35 wt %, and more preferably from 18-32 wt %.

The content of units derived from ethylene in fraction (A) is preferably 0.3-1.7 wt %, and more preferably 0.8-1.5 wt %.

The content of units derived from ethylene in fraction (B) is preferably 9-16 wt %, and more preferably 10-15 wt %.

The ethylene content of both fraction (A) and the overall composition is measured by FTIR. The proportion of fraction (B) in the final composition is determined by comparing the level of catalyst residues in fraction (A) with that in the final composition (ie fraction (A)+fraction (B)), on the assumption that fraction (B) is free of catalyst residues, since no additional catalyst has been added during the production of fraction (B). Similarly the ethylene content in fraction (B) is calculated based on the proportion of fraction (B), the ethylene content of fraction (A) and the ethylene content of the final composition.

Fraction (A) preferably has an intrinsic viscosity $\eta$ prior to any degradation treatment of 0.75-1.7 dl/g, preferably 0.8-1.5 dl/g and more preferably 0.9-1.3 dl/g.

The composition of the invention preferably has an intrinsic viscosity $\eta$ prior to any degradation treatment of 0.75-1.7 dl/g, more preferably 0.9-1.5 dl/g and most preferably 1-1.3 dl/g.

The intrinsic viscosity ratio of fractions (A) and (B), $\eta(A)/\eta(B)$, prior to any degradation treatment, is preferably 0.6-1.25, more preferably 0.65-1.1 and most preferably 0.7-1.

Intrinsic viscosity is determined in tetrahydronaphthalene at 135° C.

The compositions of the present invention preferably have an impact strength (notched Izod according to ISO 180/1 A or notched Charpy according to IS0179/1eA) of at least 4.8 KJ/m$^2$ at 23° C. or at least 2.8 KJ/m$^2$ at 0° C.

The compositions of the present invention preferably have a flexural modulus (measured according to ISO 178) of at least 1100 MPa.

The compositions of the present invention preferably have haze values measured on a 2 mm injection-moulded plaque below 45%. Haze values are measured using a "Haze-Guard plus" haze meter from BYK Garder referred to in ASTM-D1003.

The crystallisation temperature (Tc) of the compositions of the invention, as measured by Differential Scanning Calorimetry (DSC) with a cooling rate of 10° C./min, is preferably above 123° C. This can represent a significant advantage in processing the material by injection moulding, where a shorter cooling time can enable a shorter cycle time in the process.

The compositions of the present invention preferably have a Vicat softening point (measured using IS0306 under a 10N load) above 130° C. They also preferably have a Heat Distortion Temperation (HDT, measured according to IS075-1&2, method B under 0.45 MPa load) above 85° C. Both of these properties indicate improved heat resistance compared with standard random copolymers.

It is preferred that the sum $(C2(B)*W_B/\eta_B)+(C2(A)*W_A/\eta_A)$ wherein C2(B) and C2(A) are the ethylene weight fractions in components (B) and (A), respectively, $W_B$ and $W_A$ are the weight fractions, relative to the total composition, of components B and A respectively, is no more than 3.6. Such compositions can have reduced levels of hexane extractables.

In the composition of the present invention, the moiety of hexane extractables is preferably lower than 5.5 wt %, in particular lower than 4.5 wt %. The hexane extractable fraction is determined according to FDA method 177, section 1520, Annex B) on polymer formed into 100 µm thick films.

The propylene polymers and propylene polymer compositions used for the articles of the present invention can also contain additives commonly employed in the art, such as antioxidants, light stabilisers, heat stabilisers, nucleating agents, clarifying agents, colourants and fillers. In particular, the addition of nucleating agents brings about a considerable improvement in important physical-mechanical properties, such as flexural modulus, heat distortion temperature (HDT), tensile strength at yield and transparency.

Examples of nucleating agents are p-tert.-butyl benzoate and 1,3- and 2,4-dibenzylidenesorbitols, and 1,2,3-trideoxy-4,6:5,7-bis-O[(4-propylphenyl) methylene]-nonitol.

The nucleating agents are preferably added in quantities ranging from 0.05 to 2% by weight, more preferably from 0.1 to 1% by weight, and most preferably from 0.15% to 0.5% by weight, with respect to the total weight.

The clarifying agent is preferably present in the composition in an amount of from 0.01 to 0.6 wt %, preferably 0.1 to 0.5 wt % and more preferably 0.2 to 0.4 wt %. An example of a clarifying agent is Millad NX-8000.

The addition of inorganic fillers, such as talc, calcium carbonate and mineral fibers, also brings about an improvement to some mechanical properties, such as flexural modulus and HDT. Talc can also have a nucleating effect.

The propylene random copolymers of the invention can be prepared under process conditions known to the skilled person for the preparation of random copolymers. It is preferred that the propylene random copolymer is produced in a process comprising the following steps:

(i) preparing in a first stage a propylene random copolymer, and (ii) transferring the propylene random copolymer to a second stage where (co)polymerisation is continued to prepare another propylene random copolymer. With the above defined process, a propylene random copolymer/propylene random copolymer mixture can be produced.

In an alternative embodiment, it is possible to make the second propylene random copolymer in another part of the same reactor as that used to make the first copolymer. This requires a sufficiently high concentration of comonomer and hydrogen to be obtained in that part of the reactor.

The propylene random copolymers of the invention are advantageously produced in the gas phase. Gas-phase or vapour-phase olefin polymerisation processes are disclosed generally in "Polypropylene Handbook" pp. 293-298, Hanser Publications, NY (1996), and more fully described in "Simplified Gas-Phase Polypropylene Process Technology" presented in Petrochemical Review, March, 1993.

A gas-phase reactor system may function as a plug-flow reactor in which a product is not subject to backmixing as it passes through the reactor, such that conditions at one part of the reactor may be different from conditions at another part of the reactor. An example of a substantially plug-flow system is a horizontal, stirred, subfluized bed system such as described in U.S. Pat. No. 3,957,448; U.S. Pat. No. 3,965,083; U.S. Pat. No. 3,971,768; U.S. Pat. No. 3,970,611; U.S. Pat. No. 4,129,701; U.S. Pat. No. 4,101,289; U.S. Pat. No. 4,130,699; U.S. Pat. No. 4,287,327; U.S. Pat. No. 4,535,134; U.S. Pat. No. 4,640,963; U.S. Pat. No. 4,921,919, U.S. Pat. No. 6,069,212, U.S. Pat. No. 6,350,054; and U.S. Pat. No. 6,590,131. It is preferred that the reactor system used to make the compositions of the present invention functions as a plug-flow reactor.

The term "plug-flow reactor" refers to reactors for conducting a continuous fluid flow process without forced mixing at a flow rate such that mixing occurs substantially only transverse to the flow stream. Agitation of the process stream may be desirable, particularly where particulate components are present; if done, agitation will be carried out in a manner such that there is substantially no back-mixing. Perfect plug flow cannot be achieved because the diffusion will always lead to some mixing, the process flow regime being turbulent, not laminar. Since perfect plug flow conditions are not achieved in practice, a plug flow reactor system sometimes is described as operating under substantially plug flow conditions. Depending on manufacturing process conditions, various physical properties of olefin polymers may be controlled. Typical conditions which may be varied include temperature, pressure, residence time, catalyst component concentrations, molecular weight control modifier (such as hydrogen) concentrations, and the like.

The catalyst system used in the process is preferably a Ziegler-Natta catalyst system. Typical Ziegler-Natta catalyst systems contain a transition-metal (typically IUPAC a Group 4-6 metal) component, preferably a titanium-containing component, together with an organometallic compound such as an aluminum alkyl species. A typical and preferable titanium-containing component is a titanium halide compound, based on titanium tetrahalide or titanium trihalide, which may be supported or combined with other material. These systems are now well-known in the art. The solid transition metal component typically also contains an electron donor compound to promote stereospecificity. The supported titanium-containing olefin polymerisation catalyst component is usually formed by reacting a titanium (IV) halide, an organic electron donor compound and a magnesium-containing compound. Optionally, such supported titanium-containing reaction product may be further treated or modified by further chemical treatment with additional electron donor or Lewis acid species.

Suitable magnesium-containing compounds include magnesium halides; the reaction product of a magnesium halide such as magnesium chloride or magnesium bromide with an organic compound, such as an alcohol or an organic acid ester, or with an organometallic compound of metals of Groups 1, 2, or 13; magnesium alcoholates; or magnesium alkyls.

Suitable solid supported titanium catalyst systems are described in U.S. Pat. No. 4,866,022, U.S. Pat. No. 4,988,656, U.S. Pat. No. 5,013,702, U.S. Pat. No. 4,990,479 and U.S. Pat. No. 5,159,021.

In a typical supported catalyst useful for preparing the propylene copolymers of the present invention, the magnesium to titanium molar ratio may range from 1:1 to 30:1, more preferably from 10:1 to 20:1. The internal electron donor components are typically incorporated into the solid, supported catalyst component in a total amount ranging up to about 1 mole per mole of titanium in the titanium compound. Typical amounts of internal donor are from 0.01 to 1 moles per mole of titanium.

The solid titanium-containing component preferably 1-6 wt % titanium, 10-25 wt % magnesium, and 45-65 wt % halogen. Typical solid catalyst components contain 1-3.5 wt % titanium, 15-21 wt % magnesium and from 55-65 wt % chlorine.

Preferred internal electron donor compounds include esters of aromatic acids. Electron donors of mono- and dicarboxylic acids and halogen, hydroxyl, oxo-, alkyl-, alkoxy-, aryl-, and aryloxy-substituted aromatic mono- and dicarboxylic acids are preferred. Among these, the alkyl esters of benzoic and halobenzoic acids wherein the alkyl group contains 1 to about 6 carbon atoms, such as methyl benzoate, methyl bromobenzoate, ethyl benzoate, ethyl chlorobenzoate, ethyl bromobenzoate, butyl benzoate, isobutyl benzoate, hexyl benzoate, and cyclohexyl benzoate, are preferred. Other preferable esters include ethyl p-anisate and methyl p-toluate. An especially preferred aromatic ester is a dialkylphthalate ester in which the alkyl group contains from about two to about ten carbon atoms. Examples of preferred phthalate ester are diisobutylphthalate, diethylphthalate, ethylbutylphthalate and d-n-butylphthalate. Other useful internal donors are substituted diether compounds, esters of substituted succinic acid, substituted glutaric acid, substituted malonic acid, and substituted fumaric or maleic acids.

The co-catalyst component preferably is an organoaluminum compound that is halogen free. Suitable halogen-free organoaluminum compounds include, for example, alkylaluminum compounds of the formula $AlR_3$, where R denotes an alkyl radical having 1 to 10 carbon atoms, such as, for example, trimethylaluminum (TMA), triethylaluminum (TEA) and triisobutylaluminum (TIBA).

It is also preferred to employ one or more external modifiers, typically electron donors, such as silanes, mineral acids, organometallic chalcogenide derivatives of hydrogen sulfide, organic acids, organic acid esters and mixtures thereof.

Organic electron donors useful as external modifiers for the aforesaid cocatalyst system are organic compounds containing oxygen, silicon, nitrogen, sulfur, and/or phosphorus. Such compounds include organic acids, organic acid anhydrides, organic acid esters, alcohols, ethers, aldehydes, ketones, silanes, amines, amine oxides, amides, thiols, various phosphorus acid esters and amides, and the like. Mixtures of organic electron donors also may be used.

Particularly preferred are aliphatic or aromatic silane external modifiers. Preferable silanes include alkyl-, aryl-, and/or alkoxy-substituted silanes containing hydrocarbon moieties with 1 to about 20 carbon atoms. Especially preferred are silanes having a formula $Si(OR)_n R'_{4-n}$, where R and R' are selected independently from C1-C20 alkyl and cycloalkyl groups and n=1-4. Preferred silanes include isobutyltrimethoxysilane, diisobutyldimethoxysilane, diisopropyldimethoxysilane, n-propyltriethoxysilane, isobutylmethyldimethoxysilane, isobutylisopropyldimethoxysilane, dicyclopentyldimethoxysilane, dicyclohexyldimethoxysilane, diphenyldimethoxysilane, di-t-butyldimethoxysilane, t-butyltrimethoxysilane, cyclohexylmethyldimethoxysilane, tetraethoxysilane, cyclohexylmethyldimethoxysilane, isopropyltriethoxysilane, octyltriethoxysilane, and the like. Mixtures of silanes may be used.

A typical catalyst system for the polymerization or copolymerization of alpha olefins is formed by combining the supported titanium-containing catalyst or catalyst component of this invention and an alkyl aluminum compound as a co-catalyst, together with at least one external modifier which typically is an electron donor and, preferably, is a silane. It is preferred that the solid titanium-containing component is added to the first reactor of a multi-reactor system in conjunction with, but separately from, the aluminum alkyl co-catalyst component and additional modifier components. Separation of the catalyst and co-catalyst components is desirable to avoid polymerisation if monomer is present in the catalyst feed lines. Typically, catalyst components are injected into a polymerisation gas-phase reactor in liquid monomer.

Details of a preferred process and catalyst system useful for making the compositions of the present invention can be found in WO 2008/109042. Details of preferred catalysts can also be found in U.S. Pat. No. 4,886,022.

The compositions of the present invention are suitable for making cast films or sheets and injection-moulded articles, which may be used as containers eg for food and drink, or caps and closures. The compositions can also be used for making articles by injection stretch blow moulding.

The cast films, sheets and injection-moulded items can be prepared by well-known processes. The films typically have thicknesses ranging from 10 to 100 μm, whilst sheets generally have thicknesses of at least 100 μm.

The cast films and sheets can be mono- or multilayered films/sheets. In multilayered films/sheets at least the base layer (also called "support layer") that is in contact with food comprises the propylene polymer composition according to the present invention. The other layer(s) may comprise other kinds of polymers, such as crystalline or semi-crystalline polymers of $C_2$-$C_6$ α-olefins (eg LLDPE or LDPE), polyamide and poly (ethylene-co-vinyl acetate). Such multilayered films/sheets are produced by coextrusion.

EXAMPLES

Compositions according to the invention were made in a two reactor continuous polymerisation reactor system. Each of the two reactors was a 3.8-liter gas-phase, horizontal, cylindrical reactor measuring 100 mm in diameter and 300 mm in length. An inter-stage gas exchange system was located between the two reactors which was capable of capturing first reactor polymerisation product, being vented to remove first reactor gas, and then refilled with gas from the second reactor. This gas exchange system was present in order to preserve different gas compositions in each reactor stage. The first reactor was equipped with an off-gas port for recycling reactor gas through a condenser and back through a recycle line to nozzles in the reactor. In the first reactor, liquid propylene was used as a quench liquid to help control the temperature of the polymerisation. The reactor was operated in a continuous fashion. The second reactor was equipped with an off-gas port for recycling reactor gas but in this case no condenser was present. The second reactor was equipped with a constant temperature bath system which circulated water to heat transfer coils wrapped around the outside of the reactor, in order to maintain reactor temperature.

Polymerisation was initiated by the introduction to the first reactor of a high activity supported titanium containing catalyst component produced in accordance with U.S. Pat. No. 4,886,022. The titanium-containing catalyst component was introduced as a slurry (0.5-1.5 wt %) in hexane through a liquid propylene-flushed catalyst addition nozzle. A mixture of an organosilane modifier plus trialkylaluminum (TEA or TNHA) co-catalyst in hexane was fed separately to the first reactor through a different liquid propylene-flushed addition nozzle with an Al/Si ratio of 6. During polymerisation, active polymer powder was captured from the first reactor and exposed to a series of gas venting and re-pressurization steps, before being added to the second reactor. Hydrogen was fed to each reactor through a separate Brooks mass-flow meter on each reactor system in order to achieve the desired powder melt flow rate (MFR). Ethylene and propylene were fed separately to the second reactor through mass-flow meters in order to maintain the desired ratio of the two gases.

Comparative Examples 1-3 are monomodal.

TABLE

|  |  | Example ||||||||| 
|  |  | 1 | 2 | 3 | 4 | 5 | 6 | Comp 1 | Comp 2 | Comp 3 |
| --- | --- | --- | --- | --- | --- | --- | --- | --- | --- | --- |
| TEA/Donor | g/g | 2.6 | 2.6 | 2.6 | 2.6 | 2.6 | 2.6 | 2.6 | 2.6 | 2.6 |
| TEA/Catalyst | g/g | 6.6 | 6.6 | 6.6 | 6.6 | 6.6 | 6.6 | 6.6 | 6.6 | 6.6 |
| Component A ||||||||||| 
| Temperature | ° C. | 55 | 55 | 55 | 55 | 55 | 55 | 66 | 66 | 66 |
| Pressure | MPa | 2.1 | 2.1 | 2.1 | 2.1 | 2.1 | 2.1 | 2.2 | 2.2 | 2.2 |
| H2/(C2 + C3) | mol/mol | 0.0476 | 0.0347 | 0.0413 | 0.0250 | 0.0495 | 0.0347 | 0.0240 | 0.0221 | 0.0221 |
| C2/C3 | mol/mol | 0.0045 | 0.0042 | 0.0064 | 0.0045 | 0.0028 | 0.0040 | 0.0187 | 0.0162 | 0.0162 |
| MFR | g/10 min | 54.1 | 39.7 | 41.4 | 27.6 | 56.7 | 39.7 | 12.0 | 12.0 | 12.0 |
| C2(A) | wt % | 1.6 | 1.5 | 2.1 | 1.5 | 1.1 | 1.4 | 4.00 | 3.70 | 3.70 |
| η(A) | (dl/g) | 1.10 | 1.20 | 1.21 | 1.28 | 1.10 | 1.21 | 1.50 | 1.50 | 1.50 |
| Component B ||||||||||| 
| Temperature | ° C. | 61 | 61 | 61 | 61 | 61 | 61 |  |  |  |
| Pressure | MPa | 2.1 | 2.1 | 2.1 | 2.1 | 2.1 | 2.1 |  |  |  |
| H2/(C2 + C3) | mol/mol | 0.0259 | 0.0381 | 0.0389 | 0.0223 | 0.0241 | 0.0381 |  |  |  |
| Split | wt % | 33 | 36 | 29 | 21 | 19 | 34 |  |  |  |
| C2(B) | wt % | 8.8 | 7.1 | 7.8 | 15.0 | 15.0 | 10.2 |  |  |  |
| C2/C3 | mol/mol | 0.028 | 0.0246 | 0.0276 | 0.046 | 0.046 | 0.0312 |  |  |  |
| $\eta_B$ | (dl/g) | 1.40 | 1.12 | 1.04 | 1.57 | 1.49 | 1.09 |  |  |  |
| Final composition (ex reactor) ||||||||||| 
| MFR | g/10 min | 38.0 | 41.2 | 42.5 | 22.5 | 43.5 | 39.5 | 12.0 | 12.0 | 12.0 |
| C2(tot) | wt % | 3.9 | 3.5 | 3.7 | 4.1 | 3.7 | 4.4 | 4.0 | 3.7 | 3.7 |

TABLE-continued

| | | Example | | | | | | | | |
|---|---|---|---|---|---|---|---|---|---|---|
| | | 1 | 2 | 3 | 4 | 5 | 6 | Comp 1 | Comp 2 | Comp 3 |
| η (Whole) | (dl/g) | 1.20 | 1.17 | 1.16 | 1.34 | 1.17 | 1.17 | 1.50 | 1.50 | 1.50 |
| $\eta_B/\eta_A$ | | 0.78 | 1.07 | 1.17 | 0.82 | 0.74 | 1.11 | | | |
| $(C2(B)*W_B/\eta_B)+(C2(A)*W_A/\eta_A)$ | wt % * l/dg | 3.0 | 3.1 | 3.4 | 2.9 | 2.7 | 3.9 | | | |
| | | | | | Formulation | | | | | |
| Irganox 1010 | wt % | 0.04 | 0.04 | 0.04 | 0.04 | 0.04 | 0.04 | 0.04 | 0.04 | 0.04 |
| Irganox 168 | wt % | 0.08 | 0.08 | 0.08 | 0.08 | 0.08 | 0.08 | 0.08 | 0.08 | 0.08 |
| Calcium stearate | wt % | 0.05 | 0.05 | 0.05 | 0.05 | 0.05 | 0.05 | 0.05 | 0.05 | 0.05 |
| Millad 3988 | wt % | — | — | — | — | — | 0.18 | — | 0.18 | 0.18 |
| Millad NX8000 | wt % | 0.2 | 0.2 | 0.2 | 0.2 | 0.2 | — | — | — | — |
| Irgaclear DM | | — | — | — | — | — | — | 0.2 | — | — |
| GMS90 | wt % | 0.12 | 0.12 | 0.12 | 0.12 | 0.12 | 0.12 | 0.12 | 0.12 | 0.12 |
| MFR | g/10 min | 37 | 40 | 41 | 25 | 45 | 41 | 50 (*) | 25 (*) | 40 (*) |
| | | | | | Properties | | | | | |
| Flex Mod 23° C. | MPa | 1138 | 1175 | 1140 | 1135 | 1282 | 1088 | 1029 | 1150 | 1104 |
| Charpy 23° C. | kJ/m² | 5.5 | 4.9 | 5.0 | 5.5 | 5.2 | 6.4 | 5.5 | 4.5 | 4.5 |
| Izod 23° C. | kJ/m² | — | — | — | 5.3 | 4.8 | — | 5.3 | 4.5 | 4.6 |
| Izod 0° C. | kJ/m² | 3.0 | 2.8 | 2.8 | 3.2 | 2.8 | 3.7 | 2.9 | 2.7 | 2.7 |
| Haze 1 mm | % | — | — | — | 19.3 | 22.0 | — | — | 23.3 | — |
| Haze 2 mm | % | 33.4 | 29.6 | 28.8 | 41.4 | 39.7 | 37 | 25.2 | 37.6 | 30.0 |
| PTI 23° C. | J/mm | 17.3 | 10.3 | 13.4 | 16.4 | 5.6 | 17.8 | 18.2 | 7.8 | 5 |
| Hexane extractables (50° C.) | wt % | 4.8 | 4.7 | 5 | 3.9 | 3.7 | 6.4 | 4.3 | 3.8 | 4.1 |
| Crystallisation Temp 20° C./min | ° C. | 126 | 125 | 125 | 127 | 128 | 127 | 118 | 119 | 119 |
| Vicat 10N, ISO306 | ° C. | — | — | — | 134.0 | 136.0 | 132 | 126.0 | 130.0 | — |
| HDT ISO75-1&2 (meth B) 0.45 MPa | ° C. | — | — | — | 90.0 | 95.0 | 81 | 74.0 | 81.0 | — |

(*) Controlled rheology using Trigonox 301

For the compositions of the invention, significant properties are rigidity, impact resistance, optical properties (haze) and organoleptic properties (hexane extractables). The above Examples show that the compositions of the invention have a good balance of all these properties.

For example, the balance of rigidity and impact resistance is improved. For a comparable value of Charpy/Izod impact resistance, flexural modulus is higher in the Examples of the invention than in the Comparative Examples. Compare for instance Example 1 (Charpy) or Example 4 (Izod) with Comparative Example 1. Comparison of Comparative Example 2 with Examples 1 or 3 shows that for a comparable value of flexural modulus, Charpy impact is higher.

Examples 4 and 5 have also higher Vicat and heat distortion temperatures than the Comparative Examples, showing that the compositions of the invention have improved heat resistance.

The invention claimed is:

1. Propylene random copolymer composition comprising (A) 60-85 wt % of a copolymer of propylene and from 0.1 to 2 wt % of units derived from ethylene; and
(B) 15-40 wt % of a copolymer of propylene and from 7 to 17 wt % of units derived from ethylene,
said composition having a total ethylene content of from 3 to 4.5 wt %, and a melt flow rate value according to ISO 1133 (230° C., 2.16 kg) of from 15-100 g/10 min, wherein the sum $(C2(B)*W_B/\eta_B)+(C2(A)*W_A/\eta_A)$, is equal to lower than 36, in which C2(B) and C2(A) are the ethylene weight fractions in components (B) and (A), respectively, $W_B$ and $W_A$ are the weight fractions, relative to the total composition, of components B and A respectively, wherein $\eta_B$ and $\eta_A$ are the intrinsic viscosities of components B and A respectively, and wherein, prior to any degradation treatment, fraction (A) has an $\eta_A$ of 0.85-1.5 dl/g.

2. Composition according to claim 1, having an MFR value according to ISO 1133 of between 50 and 120 g/10 min.

3. Composition according to claim 1, which has been subjected to a degradation treatment to increase the MFR.

4. Composition according to claim 1, having an MFR value according to ISO 1133 of between 20 and 60 g/10 min.

5. Composition according to claim 4, which has not been subjected to any form of degradation in order to increase the MFR value.

6. Composition according to claim 1, wherein fraction (A) is present in an amount of 65-83 wt %.

7. Composition according to claim 1, wherein fraction (A) is present in an amount of 68-82 wt %.

8. Composition according to claim 1, wherein fraction (B) is present in an amount of 17-35 wt %.

9. Composition according to claim 1, wherein fraction (B) is present in an amount of 18-32 wt %.

10. Composition according to claim 1, wherein the content of units derived from ethylene in fraction (A) is 0.3-1.7 wt %.

11. Composition according to claim 1, wherein the content of units derived from ethylene in fraction (A) is 0.8-1.5 wt %.

12. Composition according to claim 1, wherein the content of units derived from ethylene in fraction (B) is 9-16 wt %.

13. Composition according to claim 1, wherein the content of units derived from ethylene in fraction (B) is 10-15 wt %.

14. Composition according to claim 1, wherein, prior to any degradation treatment, fraction (A) has an intrinsic viscosity η(A) of 0.75-1.7 dg/l.

15. Composition according to claim 1, wherein, prior to any degradation treatment, fraction (A) has an intrinsic viscosity $\eta(A)$ of 0.9-1.3 dg/l.

16. Composition according to claim 1, wherein, prior to any degradation treatment, the intrinsic viscosity $\eta$ is 0.75-1.7 dg/l.

17. Composition according to claim 1, wherein, prior to any degradation treatment, the intrinsic viscosity $\eta$ is 0.9-1.5 dg/l.

18. Composition according to claim 1, wherein, prior to any degradation treatment, the intrinsic viscosity $\eta$ is 1-1.3 dg/l.

19. Composition according to claim 1, wherein, prior to any degradation treatment, the intrinsic viscosity ratio of fractions (A) and (B), $\eta(A)/\eta(B)$, is 0.6-1.25.

20. Composition according to claim 1, wherein, prior to any degradation treatment, the intrinsic viscosity ratio of fractions (A) and (B), $\eta(A)/\eta(B)$, is 0.65-1.1.

21. Composition according to claim 1, wherein, prior to any degradation treatment, the intrinsic viscosity ratio of fractions (A) and (B), $\eta(A)/\eta(B)$, is 0.7-1.

22. Composition according to claim 1, wherein the moiety of hexane extractables is lower than 5.5 wt %.

23. Cast film, sheet, or injection moulded or injection stretch blow moulded article made from a composition as defined in claim 1.

24. Composition according to claim 3, wherein the degradation treatment is a peroxidic degradation treatment.

* * * * *